United States Patent
Weerasooriya et al.

(10) Patent No.: US 9,109,152 B2
(45) Date of Patent: *Aug. 18, 2015

(54) COMPOSITIONS AND METHODS FOR CONTROLLING THE STABILITY OF ETHERSULFATE SURFACTANTS AT ELEVATED TEMPERATURES

(75) Inventors: Upali P. Weerasooriya, Austin, TX (US); Gary A. Pope, Cedar Park, TX (US); Quoc P. Nguyen, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 67 days.

This patent is subject to a terminal disclaimer.

(21) Appl. No.: 12/879,352

(22) Filed: Sep. 10, 2010

(65) Prior Publication Data

US 2011/0059872 A1 Mar. 10, 2011

Related U.S. Application Data

(60) Provisional application No. 61/241,191, filed on Sep. 10, 2009, provisional application No. 61/243,025, filed on Sep. 16, 2009.

(51) Int. Cl.
C09K 8/584 (2006.01)
C09K 8/60 (2006.01)
E21B 43/00 (2006.01)

(52) U.S. Cl.
CPC ..................................... *C09K 8/584* (2013.01)

(58) Field of Classification Search
CPC .......... C09K 8/58; C09K 8/584; C09K 8/602; Y10S 507/935
USPC ........................ 507/219, 935, 936, 256, 259
See application file for complete search history.

(56) References Cited

U.S. PATENT DOCUMENTS

| | | | | |
|---|---|---|---|---|
| 3,469,630 A | * | 9/1969 | Hurd et al. | 166/252.1 |
| 3,508,612 A | * | 4/1970 | Reisberg et al. | 166/270.1 |
| 3,638,728 A | * | 2/1972 | Hill | 166/270.1 |
| 3,043,160 A | | 3/1976 | Farmer, III et al. | |

(Continued)

FOREIGN PATENT DOCUMENTS

| | | |
|---|---|---|
| EP | 0003183 | 7/1979 |
| EP | 1288274 A1 | 3/2003 |

(Continued)

OTHER PUBLICATIONS

Adkins, S., et al., "A New Process for Manufacturing and Stablizing High-Performance EOR Surfactants at Low Cost for High-Temperature, High Salinity Oil Reservoirs," Paper SPE 129923, presented at the 2010 SPE Improved Oil Recovery Symposium, Tulsa, Oklahoma, Apr. 24-28, 2010.

(Continued)

*Primary Examiner* — Aiqun Li
(74) *Attorney, Agent, or Firm* — Meunier Carlin & Curfman LLC

(57) ABSTRACT

The present invention describes the method of making an ether sulfate surfactant solution hydrolytically stable by adding one or more alkalinity generating agents at levels greater than 0.05%. The surfactant solutions of the present invention have half-lives >8 months at 100° C. and find uses in EOR applications, environmental cleanups, detergent industry, and any other surfactant based high temperature applications.

38 Claims, 11 Drawing Sheets

(56) References Cited

U.S. PATENT DOCUMENTS

| | | | |
|---|---|---|---|
| 4,004,638 A | | 1/1977 | Burdyn et al. |
| 4,011,273 A | | 3/1977 | Abend et al. |
| 4,013,577 A | * | 3/1977 | Wixon .......................... 510/324 |
| 4,060,490 A | | 11/1977 | Bernard |
| 4,120,358 A | | 10/1978 | Kalfoglou |
| 4,293,428 A | * | 10/1981 | Gale et al. ..................... 507/238 |
| 4,331,543 A | | 5/1982 | Wilson et al. |
| 4,359,093 A | | 11/1982 | Bernard |
| 4,493,371 A | | 1/1985 | Reisberg et al. |
| 4,502,541 A | * | 3/1985 | Lawson et al. ................ 166/275 |
| 4,544,494 A | * | 10/1985 | Downey et al. ............... 510/340 |
| 4,548,268 A | | 10/1985 | Stipanovic |
| 4,817,715 A | * | 4/1989 | Peru .............................. 166/266 |
| 4,842,776 A | | 6/1989 | Schmidt et al. |
| 4,886,120 A | | 12/1989 | Shupe |
| 4,943,299 A | | 7/1990 | Schulze et al. |
| 4,976,315 A | | 12/1990 | Prukop et al. |
| 5,068,043 A | | 11/1991 | Thigpen et al. |
| 5,082,591 A | | 1/1992 | Marchetto et al. |
| 5,104,983 A | | 4/1992 | Stock et al. |
| 5,777,183 A | | 7/1998 | Mueller et al. |
| 6,008,181 A | | 12/1999 | Cripe et al. |
| 6,022,834 A | | 2/2000 | Hsu et al. |
| 6,402,934 B1 | | 6/2002 | Chheda et al. |
| 7,074,753 B2 | | 7/2006 | Gallotti et al. |
| 7,076,753 B2 | | 7/2006 | Cerny et al. |
| 7,119,125 B1 | | 10/2006 | O'Lenick, Jr. et al. |
| 7,884,056 B2 | | 2/2011 | Bendejacq et al. |
| 8,372,788 B2 | | 2/2013 | Weerasooriya et al. |
| 2002/0058697 A1 | | 5/2002 | Moore et al. |
| 2005/0199395 A1 | | 9/2005 | Berger et al. |
| 2008/0176772 A1 | | 7/2008 | Berger et al. |
| 2008/0200565 A1 | | 8/2008 | Harwell et al. |
| 2008/0217064 A1 | | 9/2008 | Stoian et al. |
| 2008/0312108 A1 | | 12/2008 | Berger et al. |
| 2009/0076202 A1 | | 3/2009 | Seibold et al. |
| 2009/0270281 A1 | | 10/2009 | Steinbrenner et al. |
| 2011/0059872 A1 | | 3/2011 | Weerasooriya et al. |

FOREIGN PATENT DOCUMENTS

| | | |
|---|---|---|
| WO | 2007/117512 | 10/2007 |
| WO | 2008/079855 | 7/2008 |
| WO | 2009/021985 | 2/2009 |
| WO | WO 2009-058590 A2 | 5/2009 |
| WO | 2011/031920 | 3/2011 |
| WO | 2011/031946 | 3/2011 |
| WO | 2011/037975 | 3/2011 |

OTHER PUBLICATIONS

Flaaten, A., "Experimental Study of Microemulsion Characterization and Optimization in Enhanced Oil Recovery: A Design Approach for Reservoirs with High Salinity and Hardness," Thesis, The University of Texas at Austin (Dec. 2007); US.

Healy. R.N., et al. "Multiphase Microemulsion Systems," Society of Petroleum Engineers Journal, 16(3), Jun. 1976; pp. 147-160; Society of Petroleum Engineers; US.

Huh, C., "Interfacial Tensions and Solubilizing Abitity of a Microemulsion Phase That Coexists With Oil and Brine" Journal of Colloid and Interface Science. 71(2), Sep. 1979: pp. 408-426: Academic Press, Inc.; US.

Jackson, A.C., 2006, "Experimental Study of the Benefits of Sodium Carbonate on Surfactants for EOR," Thesis, The University of Texas at Austin (Dec. 2006).

Holm et al.; Improved Micellar-Polymer Flooding with High pH Chemicals; SPE 7583; Society of Petrolemium Engineers; Oct. 1-3, 1978: American Institute of Mining, Metallurgical and Petroleum Engineering, Inc; US.

Korean International Searching Authority; International Search Report & Written Opinion; May 31, 2011: Korean Patent Office; KR.

Talley, L.D, "Hydrolytic Stability of Alkylethoxy Sulfates," SPE Reservoir Engineering, 3(1); Feb. 1988; pp. 235-242; Society of Petroleum Engineers; US.

Winsor, Von P.A., "Solvent Properties of Amphiphilic Compounds," Butterworths Scientific Publ. Ltd. (London 1954).

Yang, H., et al., "Low-Cost High Performance Chemicals for Enhanced Recovery," Paper SPE 129978, presented at the 2010 SPE Improved Oil Recovery Symposium, Tulsa, Oklahoma, Apr. 24-28, 2010.

Zhao, Ping, "Development of High-Performance Surfactants for Difficult Oils," Thesis, The University of Texas at Austin; Dec. 2007; US.

Doashan et al; "The Effect of biosurfactant on the interfactial tension and adsorption loss of surfactant in ASP flooding"; Colloids and Surfaces A: Physicochem, Eng. Aspects 244, pp. 53-60, no month, 2004; Elsevier Science B.V., NL.

Deng, S, et al.; Effects of alkaline/surfactant/polymer on stability of oil droplets in produced water from ASP flooding; Colloids and Surfaces A: Physicochem, Eng. Aspects 211, pp. 275-284; no month, 2001: Elsevier Science B.V: NL.

Hirasaki, G.J., "Application of the Theory of Multicomponent, Multiphase Displacement to Three-Component, Two-Phase Surfactant Flooding," Apr. 2008, pp. 191-204; SPEJ, US.

Johnson, C.E., "Status of Caustic and Emulsion Methods," Jan. 1976, pp. 85-92; JPT. US.

Korean ISA; International Search Report & Written Opinion PCT/US2010/048353; Jun. 3, 2011; Korean Patent Office; KR.

Nelson, R.C., et al., "Co-Surfactant Enhanced Alkaline Flooding," 1984, SPE 12672, US.

International Bureau of WIPO, International Preliminary Report on Patentability, International Application No. PCT/US2010/048353, Mar. 22, 2012, 7 pages.

Flaaten, A., et al., "A Systematic Laboratory Approach to Low-Cost, High-Performance Chemical Flooding," Paper SPE 113469, presented at the 2008 SPE/DOE Improved Oil Recovery Symposium, Tulsa, Oklahoma, Society of Petroleum Engineers, Apr. 20-23, 2008, 20 pages.

Jamaloei, B.Y., "Insight into the Chemistry of Surfactant-Based Enhanced Oil Recovery Process," Recent Patents on Chemical Engineering, vol. 2, No. 1, 2009, pp. 1-10.

Levitt, D.B., et al., "Identification and Evaluation of High-Performance EOR Surfactants," Paper SPE 100089, presented at the SPE/DOE Improved Oil Recovery Symposium, Tulsa, Oklahoma, Society of Petroleum Engineers Reservoir Evaluation & Engineering, Apr. 2009, pp. 243-253.

Liu, Q., et al., "Surfactant Enhanced Alkaline Flooding for Western Canadian heavy oil recovery," Colloids and Surfaces A: Physiochemical and Engineering Aspects, vol. 293, 2007, pp. 63-71.

Minana-Perez, M., et al., "Solubilization of polar oils with extended surfactants," Colloids and Surfaces A: Physiochemical and Engineering Aspects, vol. 100, 1995, pp. 217-224.

O'Lenick, Jr., A.J., et al., "Effects of Branching upon Some Surfactant Properties of Sulfated Alcohols," Journal of the American Oil Chemists' Society, vol. 73, No. 7, 1996, pp. 935-937.

O'Lenick, Jr., A.J., "Guerbet Chemistry," Journal of Surfactants and Detergents, vol. 4, No. 3, Jul. 2001, pp. 311-315.

Varadaraj, E.T., et al., "Fundamental Interfacial Properties of Alkyl-Branched Sulfate and Ethoxy Sulfate Surfactants Derived from Guerbet Alcohols. 1. Surface and Instantaneous Interfacial Tensions," The Journal of Physical Chemistry, vol. 95, No. 4, 1991, pp. 1671-1676.

Yonghua, Z.G.G., et al., "Synthesis and properties of ammonium tristyrylphenol polyoxyethylene ether sulfate," Advances in Fine Fetrochemicals, vol. 12, 2002, pp. 17-21; Abstract only, 1 page.

Related U.S. Appl. No. 12/887,858, filed Sep. 22, 2010.

International Search Report and Written Opinion, dated Apr. 2, 2011 in connection with International Application No. PCT/US2011/022770.

International Preliminary Report on Patentability and Written Opinion, dated Mar. 27, 2012, in related International Application No. PCT/US2010/049784.

International Search Report, dated May 23, 2011, in related International Application No. PCT/US2010/049784.

International Preliminary Report on Patentability and Written Opinion, dated Mar. 13, 2012, in corresponding International Application No. PCT/US2010/048353.

(56) References Cited

OTHER PUBLICATIONS

International Preliminary Report on Patentability and Written Opinion, dated Mar. 13, 2012, in corresponding International Application No. PCT/US2010/048393.

Flaaten et al. ASP Chemical Flooding Without the Need for Soft Water, SPE 116754, The University of Texas at Austin, (2008), 16 pages.

International Search Report and Written Opinion of the International Searching Authority, International Application No. PCT/US2011/037903, Feb. 17, 2012, 7 pages.

Liu, S. et al. (2008). Favorable attributes of alkaline-surfactant-polymer flooding. SPE Journal, 13(01), 5-16.

Request for Ex Parte Reexamination of U.S. Patent No. 8,211,837, filed Aug. 5, 2014, 137 pages.

\* cited by examiner

Fig. 3A

TABLE 3

| EXPERIMENT | | 0.75% C32-7PO-6EO SULFATE, 0.25% C20-24 IOS, 0.40% AER. |
|---|---|---|
| HYDROCARBON | | |
| SURFACTANT | C32-7PO-6EO-SO4 | |
| CO-SURFACTANT(1) | C20-24 IOS | |
| CO-SOLVENT | TEGBE | |
| SURFACTANT CONC. | 0.75 | WT % |
| CO-SURF(1) CONC. | 0.25 | WT % |
| AEROSOL MA 80 CONC. | 0.4 | WT % |
| TEGBE CONC. | 0.5 | WT % |
| NACL:CACL RATIO | | |

| | | | | | | | | FIG. 3A | FIG. 3B |
| | | | | | | | | FIG. 3C | FIG. 3D |
| | | | | | | | | FIG. 3E | FIG. 3F |

| SALINITY (WT% NACL) | (PPM NACL) | AQUEOUS LEVEL | HYDRO CARBON LEVEL | TOP OF EMULSION | TOP INTERFACE | BOTTOM INTERFACE | BOTTOM OF EMULSION | TYPE | VOLUME OF OIL SOLUBLIZED (CC) |
|---|---|---|---|---|---|---|---|---|---|
| READING: | | 6/24/09 | #REF! | DAYS | | | | | |
| 0.25 | 2500 | 2.92 | 0.76 | | 2.82 | 3.19 | | III | 0.10 |
| 0.50 | 5000 | 2.91 | 0.74 | | 2.78 | | | I | 0.13 |
| 0.75 | 7500 | 2.92 | 0.81 | | 2.69 | | | I | 0.23 |
| 1.00 | 10000 | 2.91 | 0.80 | | 2.24 | 3.18 | | III | 0.67 |
| 1.25 | 12500 | 2.95 | 0.87 | | 2.77 | 3.76 | | III | 0.18 |
| 1.50 | 15000 | 2.90 | 0.73 | | 2.71 | 3.31 | | III | 0.19 |
| 1.75 | 17500 | 2.92 | 0.79 | | 2.80 | 3.24 | | III | 0.12 |
| 2.00 | 20000 | 2.94 | 0.80 | | 2.90 | 3.10 | | III | 0.04 |
| 2.25 | 22500 | 2.91 | 0.78 | | 2.86 | 3.38 | | III | 0.05 |
| 2.50 | 25000 | 2.96 | 0.87 | | 2.20 | 3.81 | | III | 0.76 |

Fig. 3B

:ROSOL MA-80, 0.50% TEGBE IN 24PPM WATER

| HYDROCARBON DENSITY | | G/CC | TYPICAL HYDROCARBON DENSITIES: |
|---|---|---|---|
| TOTAL SURFACTANT Cf | 1 | WT % | OCTANE |
| TOTAL ALCOHOL CONf | 0.9 | WT % | DECANE |
| POLYMER CONC. | 0 | WT % | |
| NA2CO3 CONC. | 0 | WT % | |
| WOR | 1 | | MIXED: #REF! EXTENDED SCAN |
| TEMPERATURE | #REF! | CELSIUS | |
| TUBE SIZE | 5 | ML | |

| VOLUME OF WATER SOLUBILIZED (CC) | OIL SOL RATIO (CC/CC) | WATER SOL RATIO (CC/CC) | HC SOL (MG/L) | VOLUME FRACTION OF OIL (VO) | VOLUME FRACTION OF MICROEMULSION (VME) | VOLUMN FRACTION OF WATER (VW) | VW + VME | NOTES |
|---|---|---|---|---|---|---|---|---|
| 0.27 | 4.8 | | 0 | 0.486 | 0.087 | 0.427 | 0.514 | |
| | 6.2 | | 0 | 0.479 | 0.521 | 0.000 | 0.521 | |
| | 11.1 | | 0 | 0.449 | 0.551 | 0.000 | 0.551 | |
| 0.27 | 32.1 | | 0 | 0.343 | 0.224 | 0.433 | 0.657 | |
| 0.81 | | 39.5 | 0 | 0.460 | 0.240 | 0.300 | 0.540 | |
| 0.41 | | 19.5 | 0 | 0.464 | 0.141 | 0.396 | 0.536 | |
| 0.32 | | 15.4 | 0 | 0.477 | 0.105 | 0.418 | 0.523 | |
| 0.16 | | 7.8 | 0 | 0.500 | 0.048 | 0.452 | 0.500 | |
| 0.47 | | | 0 | 0.493 | 0.123 | 0.384 | 0.507 | |
| 0.85 | | | 0 | 0.322 | 0.390 | 0.288 | 0.678 | |

Fig. 3C

| | | 7/1/09 | #REF! | DAYS | | | | |
|---|---|---|---|---|---|---|---|---|
| 0.25 | 2500 | 2.92 | 0.76 | 2.82 | | I | 0.10 |
| 0.50 | 5000 | 2.91 | 0.74 | 2.76 | | I | 0.15 |
| 0.75 | 7500 | 2.92 | 0.81 | 2.68 | | I | 0.24 |
| 1.00 | 10000 | 2.91 | 0.80 | 2.34 | 3.18 | III | 0.57 |
| 1.25 | 12500 | 2.95 | 0.87 | 2.97 | 3.05 | III | -0.02 |
| 1.50 | 15000 | 2.90 | 0.73 | 2.89 | 3.03 | III | 0.01 |
| 1.75 | 17500 | 2.92 | 0.79 | | | I | |
| 2.00 | 20000 | 2.94 | 0.80 | | | I | |
| 2.25 | 22500 | 2.91 | 0.78 | | | I | |
| 2.50 | 25000 | 2.96 | 0.87 | | | I | |

| | | 7/6/09 | #REF! | DAYS | | | | |
|---|---|---|---|---|---|---|---|---|
| 0.25 | 2500 | 2.92 | 0.76 | 2.82 | | I | 0.10 |
| 0.50 | 5000 | 2.91 | 0.74 | 2.76 | | I | 0.15 |
| 0.75 | 7500 | 2.92 | 0.81 | 2.68 | | I | 0.24 |
| 1.00 | 10000 | 2.91 | 0.80 | 2.44 | 3.18 | III | 0.47 |
| 1.25 | 12500 | 2.95 | 0.87 | | 2.98 | II | 2.95 |
| 1.50 | 15000 | 2.90 | 0.73 | | 2.90 | II | 2.90 |
| 1.75 | 17500 | 2.92 | 0.79 | | 2.92 | II | 2.92 |
| 2.00 | 20000 | 2.94 | 0.80 | GEL | GEL | I | 2.94 |
| 2.25 | 22500 | 2.91 | 0.78 | GEL | GEL | I | 2.91 |
| 2.50 | 25000 | 2.96 | 0.87 | GEL | GEL | I | 2.96 |

| | | 7/10/09 | #REF! | DAYS | | | | |
|---|---|---|---|---|---|---|---|---|
| 0.25 | 2500 | 2.92 | 0.76 | 2.82 | | I | 0.10 |
| 0.50 | 5000 | 2.91 | 0.74 | 2.76 | | I | 0.15 |

Fig. 3D

| | | | | | | | |
|---|---|---|---|---|---|---|---|
| 0.27 | 4.8 | | 0 | 0.486 | 0.514 | 0.000 | 0.514 |
| 0.10 | 7.2 | | 0 | 0.474 | 0.526 | 0.000 | 0.526 |
| 0.13 | 11.5 | | 0 | 0.446 | 0.554 | 0.000 | 0.554 |
| | 27.3 | 12.9 | 0 | 0.367 | 0.200 | 0.433 | 0.633 |
| | -1.0 | 4.9 | 0 | 0.508 | 0.019 | 0.472 | 0.492 |
| | 6.2 | | 0 | 0.506 | 0.033 | 0.461 | 0.494 |
| | | | 0 | -0.188 | 1.188 | 0.000 | 1.188 |
| | | | 0 | -0.190 | 1.190 | 0.000 | 1.190 |
| | | | 0 | -0.185 | 1.185 | 0.000 | 1.185 |
| | | | 0 | -0.211 | 1.211 | 0.000 | 1.211 |

| | | | | | | | |
|---|---|---|---|---|---|---|---|
| 0.27 | 4.8 | | 0 | 0.486 | 0.514 | 0.000 | 0.514 |
| 0.03 | 7.2 | | 0 | 0.474 | 0.526 | 0.000 | 0.526 |
| 0.00 | 11.5 | | 0 | 0.446 | 0.554 | 0.000 | 0.554 |
| 0.00 | 22.5 | 12.9 | 0 | 0.390 | 0.176 | 0.433 | 0.610 |
| | | 1.5 | NA | 0 | 0.511 | 0.489 | 1.000 |
| | | 0.0 | NA | 0 | 0.508 | 0.492 | 1.000 |
| | | 0.0 | 0 | -0.188 | 1.188 | 0.000 | 1.188 |
| | | | 0 | -0.190 | 1.190 | 0.000 | 1.190 |
| | | | 0 | -0.185 | 1.185 | 0.000 | 1.185 |
| | | | 0 | -0.211 | 1.211 | 0.000 | 1.211 |

| | | | | | | | |
|---|---|---|---|---|---|---|---|
| | 4.8 | | 0 | 0.486 | 0.514 | 0.000 | 0.514 |
| | 7.2 | | 0 | 0.474 | 0.526 | 0.000 | 0.526 |

⑤

| | | | | | | | |
|---|---|---|---|---|---|---|---|
| 0.75 | 7500 | 2.92 | 0.81 | | 2.68 | | | 0.24 |
| 1.00 | 10000 | 2.91 | 0.80 | | 2.53 | 3.30 | I | 0.38 |
| 1.25 | 12500 | 2.95 | 0.87 | | 2.80 | 3.59 | III | 0.15 |
| 1.50 | 15000 | 2.90 | 0.73 | | 2.80 | 3.00 | III | 0.10 |
| 1.75 | 17500 | 2.92 | 0.79 | | | | III | 2.92 |
| 2.00 | 20000 | 2.94 | 0.80 | GEL | | 2.91 | II | 2.94 |
| 2.25 | 22500 | 2.91 | 0.78 | GEL | | 2.91 | I | 2.91 |
| 2.50 | 25000 | 2.96 | 0.87 | GEL | | | I | 2.96 |

⑦

| | | 9/15/09 | #REF! | DAYS | | | | |
|---|---|---|---|---|---|---|---|---|
| 0.25 | 2500 | 2.92 | 0.76 | | 2.82 | | | 0.10 |
| 0.50 | 5000 | 2.91 | 0.74 | | 2.79 | | I | 0.12 |
| 0.75 | 7500 | 2.92 | 0.81 | | 2.78 | | I | 0.14 |
| 1.00 | 10000 | 2.91 | 0.80 | | 2.69 | 3.30 | III | 0.22 |
| 1.25 | 12500 | 2.95 | 0.87 | | 2.72 | 2.97 | III | 0.23 |
| 1.50 | 15000 | 2.90 | 0.73 | | | 2.97 | II | 2.90 |
| 1.75 | 17500 | 2.92 | 0.79 | | | 2.92 | II | 2.92 |
| 2.00 | 20000 | 2.94 | 0.80 | GEL | | 2.95 | II | 2.94 |
| 2.25 | 22500 | 2.91 | 0.78 | GEL | | | I | 2.91 |
| 2.50 | 25000 | 2.96 | 0.87 | GEL | | | I | 2.96 |

| | | | | | | | | |
|---|---|---|---|---|---|---|---|---|
| 0.39 | 11.5 | | 0 | 0.446 | 0.554 | 0.000 | 0.554 | |
| 0.64 | 18.2 | 18.7 | 0 | 0.412 | 0.183 | 0.405 | 0.588 | |
| 0.10 | | | 0 | 0.467 | 0.191 | 0.341 | 0.533 | |
| -0.01 | | 4.8 | NA | 0.485 | 0.047 | 0.468 | 0.515 | |
| -0.03 | | 0.0 | 0 | 0 | 0.504 | 0.496 | 1.000 | |
| | | 0.0 | 0 | -0.190 | 1.190 | 0.000 | 1.190 | |
| | | | 0 | -0.185 | 1.185 | 0.000 | 1.185 | |
| | | | 0 | -0.211 | 1.211 | 0.000 | 1.211 | |

| | | | | | | | | |
|---|---|---|---|---|---|---|---|---|
| 0.39 | 4.8 | | 0 | 0.486 | 0.514 | 0.000 | 0.514 | |
| 0.02 | 5.7 | | 0 | 0.481 | 0.519 | 0.000 | 0.519 | |
| 0.07 | 6.7 | | 0 | 0.470 | 0.530 | 0.000 | 0.530 | |
| 0.00 | 10.5 | 18.7 | NA | 0.450 | 0.145 | 0.405 | 0.550 | |
| 0.01 | 11.2 | 1.0 | NA | 0.448 | 0.061 | 0.492 | 0.552 | |
| | | 3.3 | 0 | 0.525 | 0.475 | 1.000 | | |
| | | 0.5 | 0 | 0.506 | 0.494 | 1.000 | | |
| | | | 0 | -0.190 | 1.190 | 0.000 | 1.190 | |
| | | | 0 | -0.185 | 1.185 | 0.000 | 1.185 | |
| | | | 0 | -0.211 | 1.211 | 0.000 | 1.211 | |

⑦

TABLE 4

SURFACTANT MIXING SHEET

| EXPERIMENT: | CN-044 | DATE: | 6/18/09 | | |
|---|---|---|---|---|---|
| NAME: | | | | | |
| SURFACTANT STOCK CONCENTRATION: | | 3.0% C32-7PO-6EO-SO4, 1% C20-24 IOS, 1.6% AEROSOL MA-80, 2.0% TEGBE IN 24PPM | | | |
| SURFACTANT EXPERIMENT CONCENTRATION: | | 0.75% C32-7PO-6EO-SO4, 0.25% C20-24 IOS, 0.4% AEROSOL MA-80, 0.5% TEGBE IN 24 | | | |
| OIL: | LY-191 | COMMENTS: | | | |
| TEMP: | 100 [DEG C] | | | | |
| TARGET NACL AMOUNT: | | | | | |

TOTAL AMOUNT OF STOCK  30  [GRAMS]

| COMPONENT | NAME | LOT # | ACTIVITY (%) | EXPERIMENT WT % DESIRED | STOCK X 4 | MASS CALC. [GRAMS] | MASS ACTUAL [GRAMS] | ORDER OF ADDITION |
|---|---|---|---|---|---|---|---|---|
| SURFACTANT | C32-7PO-6EO-SO4 | | 100.00% | 0.75% | 3.00% | 0.900 | | |
| CO-SURFACTANT | C20-24 IOS | | 60.70% | 0.25% | 1.00% | 0.494 | | |
| | | | | 0.00% | 0.00% | | | |
| COSOLVENT | AEROSOL MA-80-I | | 80.00% | 0.40% | 1.60% | 0.600 | | |
| COSOLVENT | TEGBE | | 100.00% | 0.50% | 2.00% | 0.600 | | |
| SALT | | | 0.00% | 0.00% | 0.00% | | | |
| | | | | | | | | |
| | | | | 0.00% | 0.00% | | | |
| | | | | 0.00% | 0.00% | | | |
| FILTERED | DI | | | | | 27.406 | | |
| | TOTAL STOCK: | | | | | 30.000 | | |

FILTER .45 UM:
PH:

Fig. 4

COMPOSITIONS AND METHODS FOR CONTROLLING THE STABILITY OF ETHERSULFATE SURFACTANTS AT ELEVATED TEMPERATURES

CROSS-REFERENCE TO RELATED APPLICATIONS

This Application for Patent claims the benefit of priority from U.S. Provisional Patent Application Ser. No. 61/241,191, filed Sep. 10, 2009, entitled "Process of Using Hard Brine At High Alkalinity For Enhanced Oil Recovery (EOR) Applications," which provisional patent application is commonly assigned to the assignee of the present invention, and which disclosure is considered part of and is incorporated by reference in its entirety in the disclosure of this application.

This Application for Patent also claims the benefit of priority from U.S. Provisional Patent Application Ser. No. 61/243,025, filed Sep. 16, 2009, entitled "Compositions And Methods For Controlling The Stability Of Ethersulfate Surfactants Of Elevated Temperatures," which provisional patent application is commonly assigned to the assignee of the present invention, and which disclosure is considered part of and is incorporated by reference in its entirety in the disclosure of this application.

TECHNICAL FIELD OF THE INVENTION

The present invention relates in general to the field of oil recovery, and more particularly, to controlling the stability of ethersulfate surfactants at elevated temperatures by enhancing the hydrolytic stability of ethersulfate surfactants to control their rate of decomposition over time.

BACKGROUND OF THE INVENTION

Without limiting the scope of the invention, its background is described in connection with methods and techniques for improving stability of anionic surfactants used in oil recovery.

U.S. Pat. No. 4,976,315 issued to Prukop and Chea (1990) discloses a method for increasing the recovery of oil in enhanced oil recovery operations employing anionic surfactant by blending a taurine with said anionic surfactant. The taurine may also increase the salt and divalent ion tolerance of the anionic surfactant.

Sulfonate surfactants have been the exclusive choice for high temperature application due to presumed instability of ether sulfate (ES) surfactants. As sulfonates in general are more expensive than sulfates, the costs were prohibitively high in some cases for enhanced oil recovery (EOR) to be even considered.

U.S. Pat. No. 4,331,543 issued to Wilson and Pao (1982) describes a process for the recovery of oil from subterranean oil reservoirs by waterflooding employing ether-linked sulfonate surfactants in which oxidative degradation of the surfactant is retarded through the establishment of an anaerobic condition in the surfactant solution or through the use of oxidation inhibitors. According to the '543 Patent the anaerobic condition may be provided by mechanical means such as scrubbing the injected water with an inert gas in order to remove oxygen or by employing produced well water which is handled under a closed system to exclude oxygen. A preferred class of oxidation inhibitors is sterically hindered phenolic compounds which function as free radical chain inhibitors.

U.S. Pat. No. 3,943,160 issued to Farmer et al. (1976) describes a waterflood oil recovery process, in which a mixture of petroleum sulfonate and alkoxylated alcohol sulfate surfactants is injected into a reservoir to displace oil, which is improved by using a sulfate surfactant that contains at least one chain-branching substituent on a carbon atom alpha or beta to the sulfate group. In a reservoir that is relatively hot, the improved process provides good oil-displacement efficiency and polyvalent metal ion compatibility in addition to improved stability towards hydrolytic decomposition of the sulfate surfactant.

SUMMARY OF THE INVENTION

The present invention describes the use of ether sulfates as surfactants in EOR applications under a certain set of special conditions that confer improved hydrolytic stability. Under downhole conditions the ether sulfate remains stable in the presence of agents such as NaOH, $Na_2CO_3$, Na metaborate, EDTA $Na_4$ and similar alkalinity agents. The present invention describes a process of making the sulfate surfactants hydrolytically stable as well as a way to program their destruction in a controlled way.

In general, in one aspect, the invention features a composition for high temperature surfactant based operations that includes an anionic surfactant composition, an alkalinity generating agent, and a solvent. The anionic surfactant composition includes an anionic alkoxy sulfate surfactant. The anionic surfactant composition and the alkalinity generating agent are dissolved in the solvent. The composition is operable for use in a high temperature based operation.

Implementations of the invention can include one or more of the following features:

The high temperature based operation can be enhanced oil recovery (EOR), environmental ground water cleanup, or high temperature detergent processing.

The anionic surfactant composition can include an anionic in addition to the anionic alkoxy sulfate surfactant.

The anionic surfactant composition can include a sulfonate, a carboxylate anion based surfactant, an ether sulfate, an ethoxy sulfate, a propoxy sulfate, a $C_{12-15}$-3EO sulfate, a $C_{12-15}$-12EO sulfate, a $C_{16-17}$-7PO sulfate, a $C_{13}$-7PO sulfate, a $C_{16-18}$-7PO-5EO sulfate, a $C_{20}$-7PO-10EO sulfate, a perfluorooctanoate (PFOA or PFO), a perfluorooctanesulfonate (PFOS), a sodium dodecyl sulfate (SDS), an ammonium lauryl sulfate, an alkyl sulfate salt, a sodium lauryl ether sulfate (SLES), an alkyl benzene sulfonate, a soap, a fatty acid salt, or a combination thereof.

The alkalinity generating agent can be an alkali earth metal hydroxide, NaOH, KOH, LiOH, ammonia, $Na_2CO_3$, $NaHCO_3$, Na-metaborate, a sodium silicate, a sodium orthosilicate, EDTA $Na_4$, another polycarboxylates, or a combination thereof.

The solvent can be water, a polymer containing solution, or a combination thereof.

The solvent can be either hard brine or hard water.

The can include at least about 0.05 wt % of the alkalinity generating agent.

The composition can include at least about 1 wt % of the alkalinity generating agent.

The composition can include the alkalinity generating agent in a range between about 0.05 wt % and about 2 wt %.

The composition can be hydrolytically stable at a temperature of 100° C.

The composition can have a half-life of at least 8 months at 100° C.

The composition can have a half-life at 100° C. in the range between 1 month and 24 months.

The composition could be less than 25% hydrolyzed after 4 months at 100° C.

The composition could have a degree of hydrolysis in the range between 1% and 24% after 4 months at 100° C.

The composition can be operable for use alone in an enhanced oil recovery (EOR) application.

The composition can be operable for use with an alkaline-surfactant-polymer formulation in an enhanced oil recovery (EOR) application.

The anionic surfactant composition, alkalinity generating agent, and the solvent can include, respectively, $C_{12-15}$-3EO sulfates, $Na_2CO_3$; and water. The $C_{12-15}$-3EO sulfates can include at least 1 wt % of the composition, and the $Na_2CO_3$ can include at least 1 wt % of the composition. The water can be hard brine or hard water. The composition can be hydrolytically stable at a temperature of 100° C. The composition can have a half-life of at least 8 months at 100° C. The composition would be less than 25% hydrolyzed after 4 months at 100° C.

In general, in another aspect, the invention features a method of producing a hydrolytically stable anionic surfactant composition. The method includes adding an anionic surfactant composition to a solvent. The solvent is water, a polymer containing solution, or a combination thereof. The method further includes adding a stabilizing agent to the solvent. The stabilizing agent includes an alkalinity generating agent. The alkalinity generating agent is added in an amount that is at least 0.05 wt %. The method further includes forming the hydrolytically stable anionic surfactant composition from the anionic surfactant composition, the stabilizing agent, and the solvent.

Implementations of the invention can include one or more of the following features:

The anionic surfactant composition can include an anionic in addition to the anionic alkoxy sulfate surfactant.

The anionic surfactant composition can include a sulfate, a sulfonate, a carboxylate anion based surfactant, an ether sulfate, an ethoxy sulfate, a propoxy sulfate, a $C_{12-15}$-3EO sulfate, a $C_{12-15}$-12EO sulfate, a $C_{16-17}$-7PO sulfate, a $C_{13}$-7PO sulfate, a $C_{16-18}$-7PO-5EO sulfate, a $C_{20}$-7PO-10EO sulfate, a perfluorooctanoate (PFOA or PFO), a perfluorooctanesulfonate (PFOS), a sodium dodecyl sulfate (SDS), an ammonium lauryl sulfate, an alkyl sulfate salt, a sodium lauryl ether sulfate (SLES), an alkyl benzene sulfonate, a soap, a fatty acid salt, or a combination thereof.

The alkalinity generating agent can be an alkali earth metal hydroxide, NaOH, KOH, LiOH, ammonia, $Na_2CO_3$, $NaHCO_3$, Na-metaborate, a sodium silicate, a sodium orthosilicate, EDTA $Na_4$, another polycarboxylates, or a combination thereof.

The composition can include the alkalinity generating agent in a range between about 0.05 wt % and about 2 wt %.

The composition can be hydrolytically stable at a temperature of 100° C.

The composition can have a half-life of at least 8 months at 100° C.

The composition can have a half-life at 100° C. in the range between 1 month and 24 months.

The composition could be less than 25% hydrolyzed after 4 months at 100° C.

The composition could have a degree of hydrolysis in the range between 1% and 24% after 4 months at 100° C.

The composition can be operable for use alone in an enhanced oil recovery (EOR) application.

The composition can be operable for use with an alkaline-surfactant-polymer formulation in an enhanced oil recovery (EOR) application.

The anionic surfactant composition can include $C_{12-15}$-3EO sulfates.

The anionic surfactant composition can be added in an amount that is at least 1 wt %.

The alkalinity generating agent can be $Na_2CO_3$.

The alkalinity generating agent can be added in an amount that is at least 1 wt %.

In general, in another aspect, the invention features a method of treating a hydrocarbon bearing formation. The method includes injecting a plug of a hydrolytically stable surfactant composition into the hydrocarbon bearing formation at a temperature from 25 to 120° C. The hydrolytically stable surfactant composition is in water. The hydrolytically stable surfactant composition includes an anionic surfactant composition. The hydrolytically stable surfactant composition includes an alkalinity generating agent. The concentration of the alkalinity generating agent is at least 0.05 wt %. The method further includes injecting a polymer push solution to recover hydrocarbons from the hydrocarbon bearing formation.

Implementations of the invention can include one or more of the following features:

The water can be hard water or hard brine.

The plug of the hydrolytically stable surfactant composition can be injected alone.

The plug of the hydrolytically stable surfactant composition can be injected as an alkaline-surfactant-polymer (ASP) formulation.

The anionic surfactant composition can include an anionic surfactant in addition to the anionic alkoxy sulfate surfactant.

The anionic surfactant composition can include a sulfate, a sulfonate, a carboxylate anion based surfactant, an ether sulfate, an ethoxy sulfate, a propoxy sulfate, a $C_{12-15}$-3EO sulfate, a $C_{12-15}$-12EO sulfate, a $C_{16-17}$-7PO sulfate, a $C_{13}$-7PO sulfate, a $C_{16-18}$-7PO-5EO sulfate, a $C_{20}$-7PO-10EO sulfate, a perfluorooctanoate (PFOA or PFO), a perfluorooctanesulfonate (PFOS), a sodium dodecyl sulfate (SDS), an ammonium lauryl sulfate, an alkyl sulfate salt, a sodium lauryl ether sulfate (SLES), an alkyl benzene sulfonate, a soap, a fatty acid salt, or a combination thereof.

The anionic surfactant composition comprises $C_{12-15}$-3EO sulfates.

The anionic surfactant composition is added in an amount that is at least 1 wt %.

The alkalinity generating agent can be an alkali earth metal hydroxide, NaOH, KOH, LiOH, ammonia, $Na_2CO_3$, $NaHCO_3$, Na-metaborate, a sodium silicate, a sodium orthosilicate, EDTA $Na_4$, another polycarboxylates, or a combination thereof.

The alkalinity generating agent can include $Na_2CO_3$.

The alkalinity generating agent is added in an amount that is at least 1 wt %.

BRIEF DESCRIPTION OF THE DRAWINGS

For a more complete understanding of the features and advantages of the present invention, reference is now made to the detailed description of the invention along with the accompanying figures and in which:

FIG. 3 is a table (Table 3) showing a phase behavior data recording sheet

FIG. 4 is a table (Table 4) showing a sample surfactant mixing sheet.

DETAILED DESCRIPTION OF THE INVENTION

Figure 1:
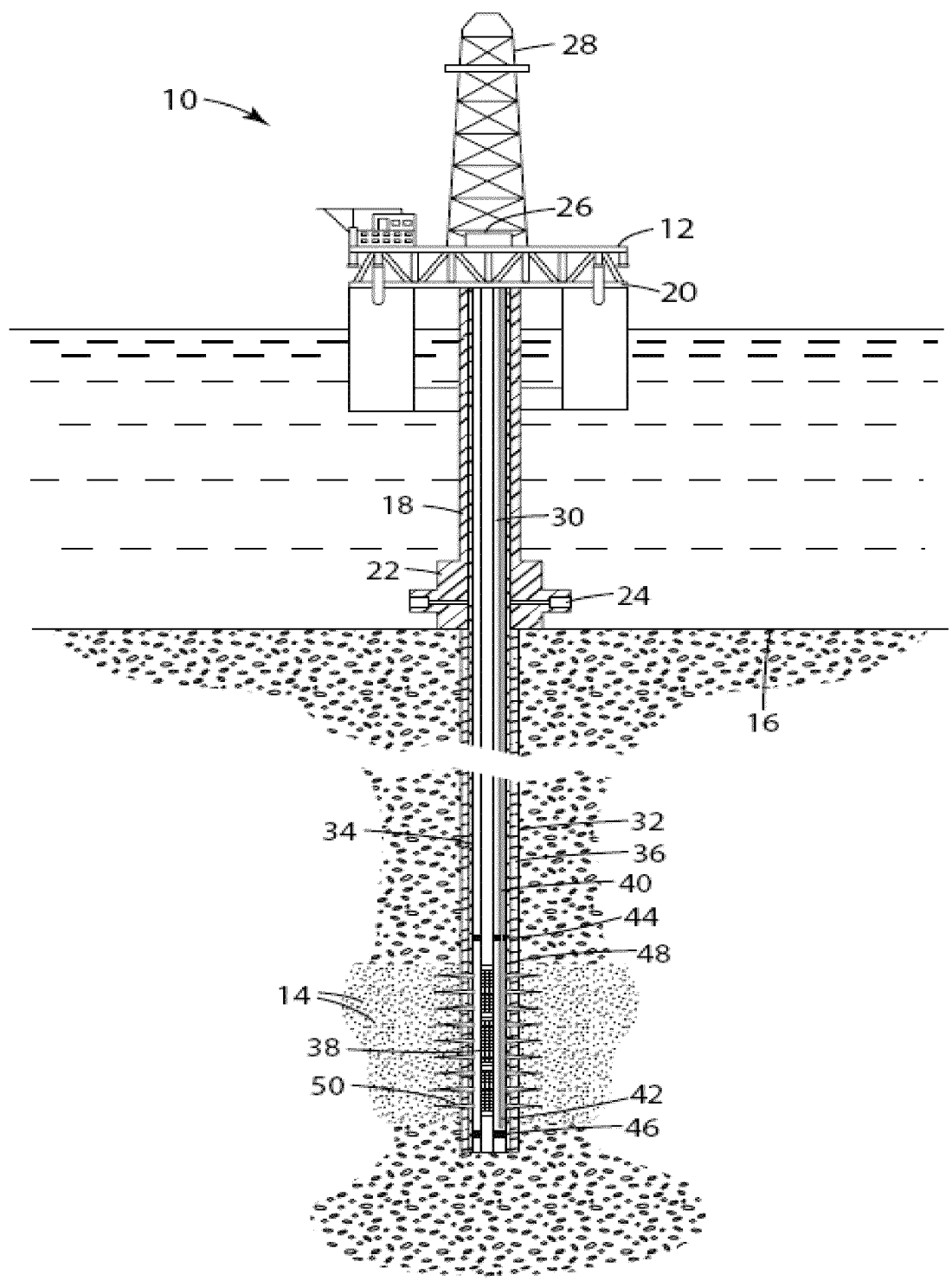
FIG. 1 is a schematic illustration of an offshore oil platform with facilities for injecting chemical solutions into the reservoir for the purpose of flooding the reservoir to enhance the oil recovery according to some embodiments of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention describes a process to enhance the stability of ether sulfate surfactants, as well as a process for controlled de-stabilization or a method of controlling their degradation by the destruction of the sulfate functionality.

Sulfate surfactants are claimed to have poor hydrolytic stability at high temperatures. (Talley 1988) Although the above observation is generally correct, under a certain set of special conditions, the sulfate surfactants can be made to be hydrolytically stable. It has been discovered that at 100° C., ether sulfates can remain hydrolytically stable above about 0.05% of alkalinity generating agents such as NaOH, $Na_2CO_3$, Na Metaborate, EDTA and similar chelating alkalinity agents. Even though the pH can still be quite high below this level, the degradation of the sulfate is rapid after a period of time, eventually resulting in complete destruction of the surfactant. The upper limit for these alkaline reagents is 1% or higher for good thermal stability for the sulfate surfactants.

Ether sulfates (ES) were claimed to have poor hydrolytic stability at elevated temperatures (>65° C.). The present invention describes specific conditions that enhance stability and control the decomposition under which hydrolysis is vastly reduced. Under acidic conditions hydrolysis is rapid.

ES surfactants are sold with a pH above 7 (usually pH~8). Raising pH to ~10 slows hydrolysis even at high temperatures. $HSO_4^-$ produced from hydrolysis reaction reduces alkalinity and speeds up the hydrolysis, as shown below:

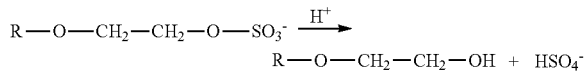

$$R-O-CH_2-CH_2-O-SO_3^- \xrightarrow{H^+} R-O-CH_2-CH_2-OH + HSO_4^-$$

The instability seen at 0.04% alkaline reagent can be exploited to control the decomposition of the sulfate surfactant. Thus, the present invention describes a method of making the sulfate surfactants hydrolytically stable as well as a way to program their destruction in a controlled way. The following illustrates the two parts of the present invention:

Part I: Stability enhancement—At 100° C., in the presence of 1% Sodium Carbonate, a 1% $C_{12-15}$-3EO Sulfate in water shows <25% hydrolysis after 4 months (by proton NMR analysis). This translates into a half-life of >8 months at 100° C.

Part II: De-stabilization of the ES—At 100° C., in the presence of much lower amounts of added alkalinity in the form of Sodium Carbonate, a 1% of the same surfactant showed complete hydrolysis as follows: (i) At 0.01% Sodium Carbonate, the ES is destroyed in <0.1 month, and (ii) at 0.05% Sodium Carbonate, the ES is destroyed in <1 month.

High starting pH is not the only factor for stability. At low pH there is rapid hydrolysis and oil separation (*). At certain high pH (Alkalinity) ranges there is minimal decomposition. However at very high pH values there is base catalyzed hydrolysis to produce alcohol ethoxylate which separates out as oil (*). The hydrolysis is more pronounced for propoxy sulfates (PS). Table 1 shows the decomposition times of some commonly used ethoxy and propoxy sulfates.

TABLE 1

Decomposition times of ethoxy and propoxy sulfates at 100° C.

| Structure | $Na_2CO_3$ Conc. (% wt.) | pH | Decomposition Time(*) (100° C.) |
|---|---|---|---|
| C12-15-12EO Sulfate | 1% | 11.29 | >8 Months (no oil) |
| C12-15-3EO Sulfate | 0.01% | 10.03 | <0.1 Months (oil appears) |
|  | 1% | 11.29 | (<9 days at 85° C.) >8.5 Months (no oil) |
| C16-17-7PO Sulfate | 0.05% | 10.40 | <3 Months (oil appears) |
|  | 0.5-1% | 11.10-11.29 | (<9 months at 85° C.) 6.5 Months (oil appears) (~1.5 years at 85° C.) |

TABLE 2

Thermal stability of sulfate surfactants at 126° C.

| Structure | $Na_2CO_3$ Conc. (% wt.) | pH | Decomp. Time(*) | $Na_2B_2O_4$ Conc. (% wt.) | pH | Decomp. Time(*) |
|---|---|---|---|---|---|---|
| C16-17-7PO Sulfate | 1.5-2% | 11.38-11.41 | 1.5 Months (2 years at 85° C.) | 1.5-2% | 10.57-10.63 | 20 Days |
| C13-7PO Sulfate | 1-2% | 11.29-11.41 | 1.5 Months | 1-1.5% 2% | 10.48-10.57 10.63 | 20 Days 38 Days |
| C16-18-7PO-5EO Sulfate | 0.1-0.25% 0.5-2% | 10.65-10.89 11.10-11.41 | 3.5 Months 3 Months | 0.1-0.25% 0.5-2% | 10.08-10.25 10.35-10.63 | 10-28 Days 3 Months |
| C20-7PO-10EO Sulfate | 0.05-0.25% 0.5% 1-2% | 10.40-10.89 11.10 11.29-11.41 | 3-4 Months 4.5 Months 3 Months | 0.25-2% | 10.25-10.63 | 3 Months |

TABLE 2-continued

Thermal stability of sulfate surfactants at 126° C.

| Structure | $Na_2CO_3$ Conc. (% wt.) | pH | Decomp. Time(*) | $Na_2B_2O_4$ Conc. (% wt.) | pH | Decomp. Time(*) |
|---|---|---|---|---|---|---|
| C12-15-3EO Sulfate | 0.05% | 10.40 | 4 Months | 0.50-2% | 10.35-10.63 | 2.5 Months |
| C12-15-12EO Sulfate | 0.05-0.50% | 10.40-11.10 | 4.5 Months (~6 years at 85° C.) | — | — | — |

This invention allows the use of sulfate surfactants under high temperature conditions and also, it teaches us how to "program" the destruction of the Sulfate functionality at a given point in time.

Sulfation of a hydrophobe is the simplest and most versatile method of making anionic surfactants. Consequently, a new array of anionic surfactants that can find applications in high temperature reservoir EOR applications becomes available. Also, if ES is used as a solubilizer to enhance the solubility of a hydrolytically stable anionic surfactant system such as a sulfonate or a carboxylate, that can be destroyed once its purpose is served and it is no longer needed as a solubilizer, i.e., ES is used as a sacrificial surfactant.

Sulfation, by virtue of its simplicity, is the least expensive method of producing an anionic surfactant. The discovery of how to vastly enhance ES stability at elevated temperatures broadens the field of low cost anionic EOR Surfactants significantly. Moreover, the use of ES as temporary solubilizers for other anionics is made possible because we should be able to pre-program the destruction of it when it has served its purpose.

The present invention can be used in any application (e.g., surface or near-surface treatments, downhole or for Enhanced Oil Recovery) that involves high temperature conditions, such as, environmental clean up of ground water contaminated by oils and other organic solvents. Also, in the detergent industry, when the application is a high temperature detersive operation, ES can be used as an anionic surfactant under the conditions desired.

The following definitions of terms apply throughout the specification and claims.

For methods of treating a hydrocarbon-bearing formation and/or a well bore, the term "treating" includes placing a chemical (e.g., a fluorochemical, cationic polymer, or corrosion inhibitor) within a hydrocarbon-bearing formation using any suitable manner known in the art (e.g., pumping, injecting, pouring, releasing, displacing, spotting, or circulating the chemical into a well, well bore, or hydrocarbon-bearing formation).

The term "polymer" refers to a molecule having a structure that essentially includes the multiple repetitions of units derived, actually or conceptually, from molecules of low relative molecular mass. The term "polymer" includes "oligomer".

The term "bonded" refers to having at least one of covalent bonding, hydrogen bonding, ionic bonding, Van Der Waals interactions, pi interactions, London forces, or electrostatic interactions.

The term "productivity" as applied to a well refers to the capacity of a well to produce hydrocarbons; that is, the ratio of the hydrocarbon flow rate to the pressure drop, where the pressure drop is the difference between the average reservoir pressure and the flowing bottom hole well pressure (i.e., flow per unit of driving force). This term is not pertinent to enhanced oil recovery. It applies to near wellbore treatments such as the 3M treatment, but here the idea is to flood the entire reservoir with chemical solutions to mobilize and displace the oil to the production wells.

"Alkyl group" and the prefix "alk-" are inclusive of both straight chain and branched chain groups and of cyclic groups having up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms.

"Alkylene" is the divalent form of the "alkyl" groups defined above.

"Arylalkylene" refers to an "alkylene" moiety to which an aryl group is attached.

The term "aryl" as used herein includes carbocyclic aromatic rings or ring systems, for example, having 1, 2, or 3 rings and optionally containing at least one heteroatom (e.g., O, S, or N) in the ring. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

"Arylene" is the divalent form of the "aryl" groups defined above.

Referring to FIG. 1, an exemplary offshore oil platform is schematically illustrated and generally designated 10. Semi-submersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat the near-wellbore region of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing formation 14 including perforations 50. Thereafter, a composition described herein is pumped down delivery tube 40 to progressively treat the near-wellbore region of hydrocarbon-bearing formation 14.

Phase Behavior Procedures

Phase Behavior Screening. Phase behavior experiments have been used to characterize chemicals for EOR. There are many benefits in using phase behavior as a screening method.

Phase Behavior studies are used to determine: (1) the effect of electrolytes; (2) oil solubilization, IFT reduction, (3) microemulsion densities; (4) surfactant and microemulsion viscosities; (5) coalescence times; (6) identify optimal surfactant-cosolvent formulations; and/or (7) identify optimal formulation for coreflood studies.

Thermodynamically stable phase can form with oil, water and surfactant mixtures. Surfactants form micellar structures at concentrations above the critical micelle concentration (CMC). The emulsion coalesces into a separate phase at the oil-water interface and is referred to as a microemulsion. A microemulsion is a surfactant-rich distinct phase consisting of surfactant, oil and water and possibly co-solvents and other components. This phase is thermodynamically stable in the sense that it will return to the same phase volume at a given temperature. Some workers in the past have added additional requirements, but for the purposes of this engineering study, the only requirement will be that the microemulsion is a thermodynamically stable phase.

The phase transition is examined by keeping all variables fixed except for the scanning variable. The scan variable is changed over a series of pipettes and may include, but is not limited to, salinity, temperature, chemical (surfactant, alcohol, electrolyte), oil, which is sometimes characterized by its equivalent alkane carbon number (EACN), and surfactant structure, which is sometimes characterized by its hydrophilic-lipophilic balance (HLB). The phase transition was first characterized by Winsor (1954) into three regions: Type I—excess oleic phase, Type III—aqueous, microemulsion and oleic phases, and the Type II—excess aqueous phase. The phase transition boundaries and some common terminology are described as follows: Type I to III—lower critical salinity, Type III to II—upper critical salinity, oil solubilization ratio (Vo/Vs), water solubilization ratio (Vw/Vs), the solubilization value where the oil and water solubilization ratios are equal is called the Optimum Solubilization Ratio ($\sigma^*$), and the electrolyte concentration where the optimum solubilization ratio occurs is referred to as the Optimal Salinity ($S^*$).

Determining Interfacial Tension. Efficient use of time and lab resources can lead to valuable results when conducting phase behavior scans. A correlation between oil and water solubilization ratios and interfacial tension was suggested by Healy and Reed (1976) and a theoretical relationship was later derived by Chun Huh (1979). Lowest oil-water IFT occurs at optimum solubilization as shown by the Chun Huh theory. This is equated to an interfacial tension through the Chun Huh equation, where IFT varies with the inverse square of the solubilization ratio:

$$\gamma = \frac{C}{\sigma^2} \quad (1)$$

For most crude oils and microemulsions, C=0.3 is a good approximation. Therefore, a quick and convenient way to estimate IFT is to measure phase behavior and use the Chun-Huh equation to calculate IFT. The IFT between microemulsions and water and/or oil can be very difficult and time consuming to measure and is subject to larger errors, so using the phase behavior approach to screen hundreds of combinations of surfactants, co-surfactants, co-solvents, electrolytes, oil, and so forth is not only simpler and faster, but avoids the measurement problems and errors associated with measuring IFT especially of combinations that show complex behavior (gels and so forth) and will be screened out anyway. Once a good formulation has been identified, then it is still a good idea to measure IFT.

Equipment. Phase behavior experiments are created with the following materials and equipment.

Mass Balance. Mass balances are used to measure chemicals for mixtures and determine initial saturation values of cores.

Water Deionizer. Deionized (DI) water is prepared for use with all the experimental solutions using a Nanopure™ filter system. This filter uses a recirculation pump and monitors the water resistivity to indicate when the ions have been removed. Water is passed through a 0.45 micron filter to eliminate undesired particles and microorganisms prior to use.

Borosilicate Pipettes. Standard 5 mL borosilicate pipettes with 0.1 mL markings are used to create phase behavior scans as well as run dilution experiments with aqueous solutions. Ends are sealed using a propane and oxygen flame.

Pipette Repeater. An Eppendorf Repeater Plus® instrument is used for most of the pipetting. This is a handheld dispenser calibrated to deliver between 25 microliter and 1 ml increments. Disposable tips are used to avoid contamination between stocks and allow for ease of operation and consistency.

Propane-oxygen Torch. A mixture of propane and oxygen gas is directed through a Bernz-O-Matic flame nozzle to create a hot flame about ½ inch long. This torch is used to flame-seal the glass pipettes used in phase behavior experiments.

Convection Ovens. Several convection ovens are used to incubate the phase behaviors and core flood experiments at the reservoir temperatures. The phase behavior pipettes are primarily kept in Blue M and Memmert ovens that are monitored with mercury thermometers and oven temperature gauges to ensure temperature fluctuations are kept at a minimal between recordings. A large custom built flow oven was used to house most of the core flood experiments and enabled fluid injection and collection to be done at reservoir temperature.

pH Meter. An ORION research model 701/digital ion analyzer with a pH electrode is used to measure the pH of most aqueous samples to obtain more accurate readings. This is calibrated with 4.0, 7.0 and 10.0 pH solutions. For rough measurements of pH, indicator papers are used with several drops of the sampled fluid.

Phase Behavior Calculations. The oil and water solubilization ratios are calculated from interface measurements taken from phase behavior pipettes. These interfaces are recorded over time as the mixtures approached equilibrium and the volume of any macroemulsions that initially formed decreased or disappeared. The procedure for creating phase behavior experiments will be discussed later.

Oil Solubilization Ratio. The oil solubilization ratio is defined as the volume of oil solubilized divided by the volume of surfactant in microemulsion. All the surfactant is presumed to be in the emulsion phase. The oil solubilization ratio is applied for Winsor type I and type III behavior. The volume of oil solubilized is found by reading the change between initial aqueous level and excess oil (top) interface level. The oil solubilization parameter is calculated as follows:

$$\sigma_o = \frac{V_o}{V_s} \quad (2)$$

$\sigma_o$ = oil solubilization ratio
$V_o$ = volume of oil solubilized
$V_s$ = volume of surfactant Water Solubilization Ratio. The water solubilization ratio is defined as the volume of water solubilized divided by the volume of surfactant in microemulsion. All the surfactant is presumed to be in the emulsion phase. The water solubilization ratio is applied for Winsor type III and type II behavior. The volume of water solubilized is found by reading the change between initial aqueous level and excess water (bottom) interface level. The water solubilization parameter is calculated as follows:

$$\sigma_w = \frac{V_w}{V_s} \quad (3)$$

$\sigma_w$ = water solubilization ratio
$V_w$ = volume of water solubilized

Optimum Solubilization Ratio. The optimum solubilization ratio occurs where the oil and water solubilization is equal. The coarse nature of phase behavior screening often does not include a data point at optimum, so the solubilization curves are drawn for the oil and water solubilization and the intersection of these two curves is defined as the optimum. The following is true for the optimum solubilization ratio:

$$\sigma_o = \sigma_\omega = \sigma^* \quad (4)$$

$\sigma^*$ = optimum solubilization parameter

Phase Behavior Methodology. The methods for creating, measuring and recording observations are described in this section. Scans are made using a variety of electrolyte mixtures described below. Oil is added to most aqueous surfactant solutions to see if a microemulsion formed, how long it took to form and equilibrate if it formed, what type of microemulsion formed and some of its properties such as viscosity. However, the behavior of aqueous mixtures without oil added is also important and is also done in some cases to determine if the aqueous solution is clear and stable over time, becomes cloudy or separated into more than one phase.

Preparation of samples. Phase behavior samples are made by first preparing surfactant stock solutions and combining them with brine stock solutions in order to observe the behavior of the mixtures over a range of salinities. All the experiments are created at or above 0.1 wt % active surfactant concentration, which is above the typical CMC of the surfactant.

Solution Preparation. Surfactant stocks are based on active weight-percent surfactant (and co-surfactant when incorporated). The masses of surfactant, co-surfactant, co-solvent and de-ionized water (DI) are measured out on a balance and mixed in glass jars using magnetic stir bars. The order of addition is recorded on a mixing sheet along with actual masses added and the pH of the final solution. Brine solutions are created at the necessary weight percent concentrations for making the scans.

Surfactant Stock. The chemicals being tested are first mixed in a concentrated stock solution that usually consisted of a primary surfactant, co-solvent and/or co-surfactant along with de-ionized water. The quantity of chemical added is calculated based on activity and measured by weight percent of total solution. Initial experiments are at about 1-3% active surfactant so that the volume of the middle microemulsion phase would be large enough for accurate measurements assuming a solubilization ratio of at least 10 at optimum salinity.

Polymer Stock. Often these stocks were quite viscous and made pipetting difficult so they are diluted with de-ionized water accordingly to improve ease of handling. Mixtures with polymer are made only for those surfactant formulations that showed good behavior and merited additional study for possible testing in core floods. Consequently, scans including polymer are limited since they are done only as a final evaluation of compatibility with the surfactant.

Pipetting Procedure. Phase behavior components are added volumetrically into 5 ml pipettes using an Eppendorf Repeater Plus or similar pipetting instrument. Surfactant and brine stocks are mixed with DI water into labeled pipettes and brought to temperature before agitation. Almost all of the phase behavior experiments are initially created with a water oil ratio (WOR) of 1:1, which involved mixing 2 ml of the aqueous phase with 2 ml of the evaluated crude oil or hydrocarbon, and different WOR experiments are mixed accordingly. The typical phase behavior scan consisted of 10-20 pipettes, each pipette being recognized as a data point in the series.

Order of Addition. Consideration had to be given to the addition of the components since the concentrations are often several fold greater than the final concentration. Therefore, an order is established to prevent any adverse effects resulting from surfactant or polymer coming into direct contact with the concentrated electrolytes. The desired sample compositions are made by combining the stocks in the following order: (1) Electrolyte stock(s); (2) De-ionized water; (3) Surfactant stock; (4) Polymer stock; and (5) Crude oil or hydrocarbon. Any air bubbles trapped in the bottom of the pipettes are tapped out (prior to the addition of surfactant to avoid bubbles from forming).

Initial Observations. Once the components are added to the pipettes, sufficient time is allotted to allow all the fluid to drain down the sides. Then aqueous fluid levels are recorded before the addition of oil. These measurements are marked on record sheets. Levels and interfaces are recorded on these documents with comments over several days and additional sheets are printed as necessary.

Sealing and Mixing. The pipettes are blanketed with argon gas to prevent the ignition of any volatile gas present by the flame sealing procedure. The tubes are then sealed with the propane-oxygen torch to prevent loss of additional volatiles when placed in the oven. Pipettes are arranged on the racks to coincide with the change in the scan variable. Once the phase behavior scan is given sufficient time to reach reservoir temperature (15-30 minutes), the pipettes are inverted several times provide adequate mixing. Tubes are observed for low tension upon mixing by looking at droplet size and how uniform the mixture appeared. Then the solutions are allowed to equilibrate over time and interface levels are recorded to determine equilibration time and surfactant performance.

Measurements and Observations. Phase behavior experiments are allowed to equilibrate in oven that is set to the reservoir temperature for the crude oil being tested. The fluid levels in the pipettes are recorded periodically and the trend in the phase behavior observed over time. Equilibrium behavior is assumed when fluid levels ceased to change within the margin of error for reading the samples.

Fluid Interfaces. The fluid interfaces are the most crucial element of phase behavior experiments. From them, the phase volumes are determined and the solubilization ratios are calculated. The top and bottom interfaces are recorded as the scan transitioned from an oil-in-water microemulsion to a water-in-oil microemulsion. Initial readings are taken one day after initial agitation and sometimes within hours of agitation if coalescence appeared to happen rapidly. Measurements are taken thereafter at increasing time intervals (for example, one day, four days, one week, two weeks, one month and so on) until equilibrium is reached or the experiment is deemed unessential or uninteresting for continued observation.

An example of a phase behavior data recording sheet and surfactant mixing sheets are shown in Tables 3 and 4 respectively. Sample calculations for determining solubilization ratios and the interfacial tension are also shown.

Figure 2:
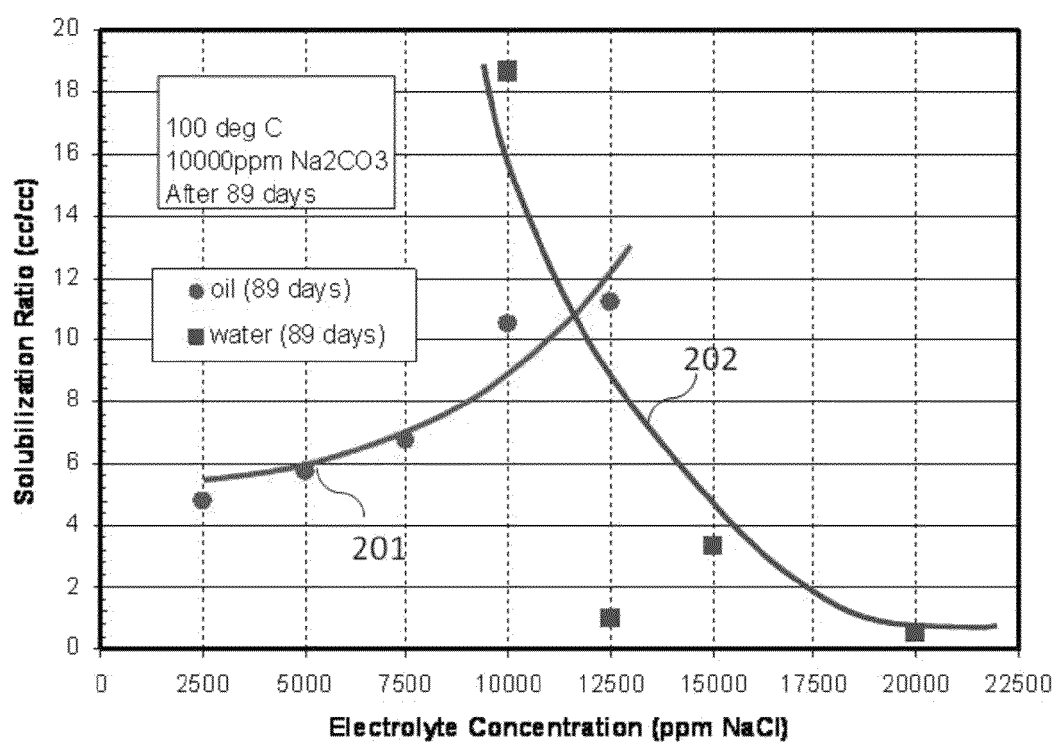
FIG. 2 is a phase behavior plot showing the thermal stability of PO-EO sulfates at 100° C.

Sample Calculations:

FIG. 2 shows the solubilization plot for CN-044 0.75% C32-7PO-6EO-Sulfate, 0.25% C20-24 IOS, 0.4% Sodium dihexyl sulfosuccinate, 0.5% Triethylene glycol monobutyl ether, 1% $Na_2CO_3$ in 24 ppm DI. C 32-7PO-6EO sulfate is a 32 carbon alcohol propoxy with 7 moles of PO, ethoxylated with 6 moles of EO, sulfated and neutralized and commercially available from Harcros Chemicals. C 20-24 IOS is 20-24 carbon internal olefin sulfonated with $SO_3$ and neutralized. This is a commercial product (S3-A) from Stepan Company. Sodium Dihexyl Sulfosuccinate (Aerosol MA-80) was obtained from CYTEC Industries and triethylene glycol monobutyl ether was obtained from Fluka Analytical. Curve 201 is for oil (89 days), and curve 202 is for water (89 days) For the above system, it can be seen from FIG. 2 that the optimum solubilization ratio (where oil and water solubilization are same) is around 11 (cc/cc) at the salinity of 11000 ppm NaCl. This particular salinity at optimum solubilization ratio is defined as optimum salinity.

FIG. 3 is a table (Table 3) showing a phase behavior data recording sheet.

FIG. 4 is a table (Table 4) showing a sample surfactant mixing sheet.

At the optimum solubilization ratio, the interfacial tensions (IFT) at oil-middle phase microemulsion & middle phase microemulsion-aqueous are the same. The IFT at optimum solubilization is widely determined by using Chun-Huh's relation (Eq. 1). For most crude oils C=0.3 is a good approximation. For the above given system, the IFT corresponding to optimum solubilization ratio of 11 cc/cc is:

$$IFT, \gamma = 0.3/11^2$$
$$= 0.002479 \text{ dynes/cm}$$

If the interfaces are hard to read, a 365 nm black light is used to illuminate the microemulsion phase and to improve the contrast between the microemulsion and the excess oleic phase.

Testing

Testing of ES surfactants under optimum conditions has shown them to be effective at high temperature and they can be made at low cost. In some embodiments, ES surfactants have are used with other surfactants, such as IOS, in very low concentrations to give extremely favorable results both in micro-emulsion phase behavior as well as in core-flood experiments.

Figure 5:
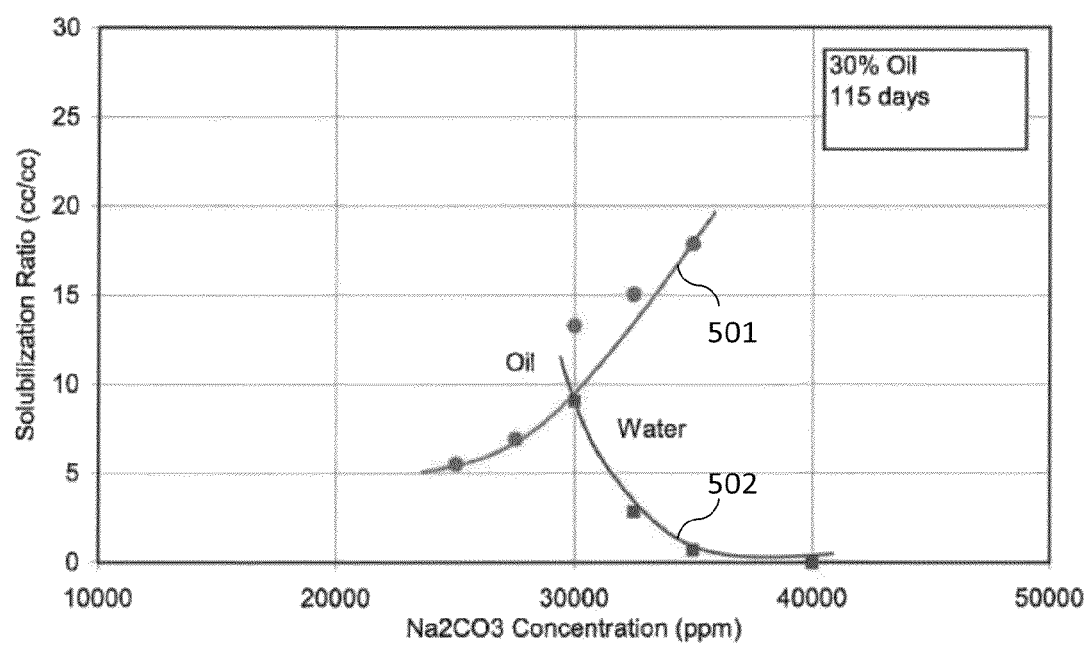
FIG. 5 is a plot showing the phase behavior of a crude oil tested with a surfactant formulation.

A crude oil (viscosity 4.5 cP) was tested with surfactant formulation containing 0.25% $C_{32}$-7PO-14EO-$SO_4$, 0.25% $C_{20-24}$ IOS, 0.50% TEGBE in 24 ppm NaCl at 100° C., and the solubilization ratio was around 10 at very favorable optimum salinity. FIG. 5 shows the results of this phase behavior test (curve 501 for oil and curve 502 for water).

Figure 6:
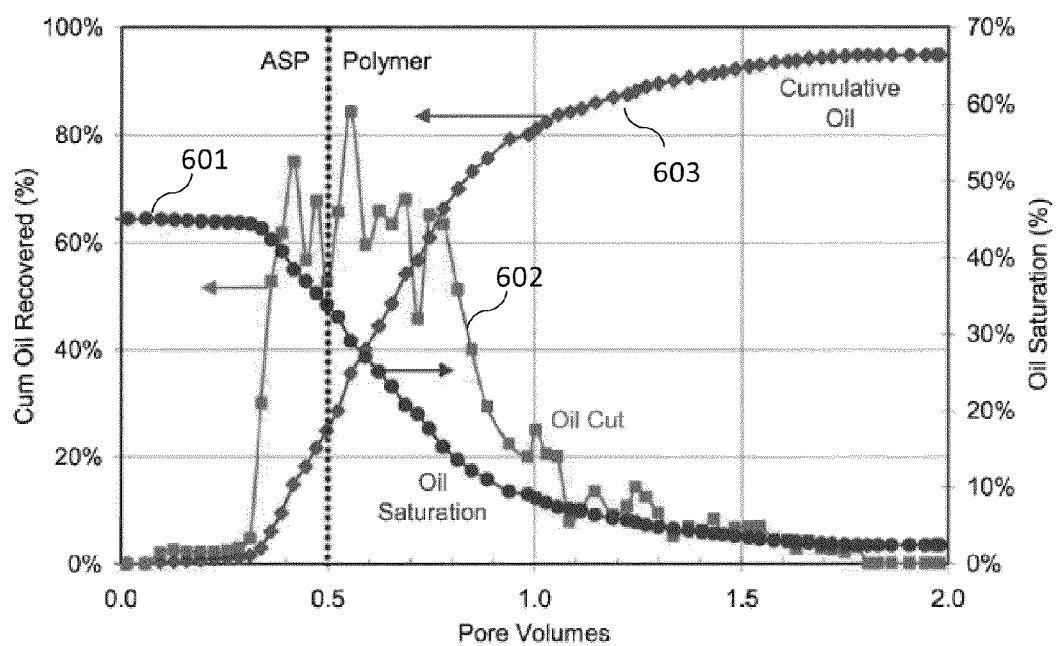
FIG. 6 is a plot (coreflood) showing oil recovery of crude oil with a surfactant formulation.

FIG. 6 illustrates the core-flood oil recovery a Bentheimer sandstone formulation ($K_{brine}$ (md) 1572, $K_{rw}$ 0.07, $S_{orw}$ 0.45) for the same crude oil using the formulation above. Curves 601, 602, and 603 are the oil saturation, oil cut, and cumulative oil, respectively. After injecting the ASP slug ($C_{surf}$ 0.5 wt %, 0.5 PV, PV*C=25%, $C_{co-solvent}$ 0.5 wt %, $C_{polymer}$ 2000 ppm, $C_{alkali}$ 30000 ppm,) with a polymer drive ($C_{polymer}$ 680 ppm) at 1 ft/day, the oil recovery was 94.7% with a final oil saturation of 0.024. Surfactant retention was determined to be 0.12 mg/g of rock. These successful results confirm that ES surfactants are viable option for high temperature EOR.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

U.S. Pat. No. 4,976,315: Use of taurine additives in enhanced oil recovery with anionic surfactants.

U.S. Pat. No. 4,331,543: Method of retarding degradation of surfactants employed in waterflooding.

U.S. Pat. No. 3,943,160: Heat-stable calcium-compatible waterflood surfactant.

Talley, L. D: *SPE Reservoir Engineering*, February, 1988, 235-242.

What is claimed is:

1. A composition for high temperature surfactant based operations comprising:
   (a) an anionic surfactant composition comprising an anionic alkoxy sulfate surfactant;
   (b) an alkalinity generating agent; and
   (c) a solvent; wherein
      (i) the anionic surfactant composition and the alkalinity generating agent are dissolved in the solvent, and
      (ii) the composition is configured for use in a high temperature based operation, wherein the anionic alkoxy sulfate surfactant comprises a $C_{12-32}$-7PO-nEO sulfate, wherein the "EO" represents one or more "ethylene oxide" segments, the "PO" represents one or more "propylene oxide" segments, and n is an integer of from 3 to 14, and
   wherein the composition comprises an effective amount of the alkalinity generating agent to produce a composition having a pH of from about 10 to 11.41.

2. The composition of claim 1, wherein the high temperature based operation is selected from the group consisting of enhanced oil recovery (EOR), environmental ground water cleanup, and high temperature detergent processing.

3. The composition of claim 1, wherein the alkalinity generating agent is selected from the group consisting of alkali earth metal hydroxides, ammonia, $Na_2CO_3$, Na-metaborate, $EDTANa_4$, and combinations thereof.

4. The composition of claim 1, wherein the solvent is selected from the group consisting of water, polymer containing solutions, and combinations thereof.

5. The composition of claim 4, wherein the solvent is water that is either hard brine or hard water.

6. The composition of claim 1, wherein the composition comprises at least about 1 wt % of the alkalinity generating agent.

7. The composition of claim 1, wherein the composition comprises the alkalinity generating agent in a range between 0.05 wt % and about 2 wt %.

8. The composition of claim 1, wherein the composition is hydrolytically stable at a temperature of 100° C.

9. The composition of claim 1, wherein the composition has a half-life of at least 8 months at 100° C.

10. The composition of claim 1, wherein the composition has a half-life at 100° C. in the range between 1 month and 24 months.

11. The composition of claim 1, wherein the composition would be less than 25% hydrolyzed after 4 months at 100° C.

12. The composition of claim 1, wherein the composition would have a degree of hydrolysis in the range between 1% and 24% after 4 months at 100° C.

13. The composition of claim 1, wherein the composition is configured for use alone in an enhanced oil recovery (EOR) application.

14. The composition of claim 1, wherein the composition is configured for use with an alkaline-surfactant-polymer formulation in an enhanced oil recovery (EOR) application.

15. The composition of claim 1, where
   (a) the anionic surfactant composition further comprises $C_{12-15}$-3EO sulfates;
   (b) the alkalinity generating agent comprises $Na_2CO_3$; and
   (c) the solvent is water.

16. The composition of claim 15, wherein,
   (a) the $C_{12-15}$-3EO sulfates comprise at least 1 wt % of the composition; and
   (b) the $Na_2CO_3$ comprises at least 1 wt % of the composition.

17. The composition of claim 15, wherein the water is hard brine or hard water.

18. The composition of claim 15, wherein the composition is hydrolytically stable at a temperature of 100° C.

19. The composition of claim 15, wherein the composition has a half-life of at least 8 months at 100° C.

20. The composition of claim 15, wherein the composition would be less than 25% hydrolyzed after 4 months at 100° C.

21. The composition of claim 1, wherein the anionic alkoxy sulfate surfactant is selected from the group consisting of $C_{16-18}$-7 PO -5 EO sulfates, $C_{20}$-7PO -10 EO sulfates, $C_{32}$-7PO -6EO sulfates, $C_{32}$-7PO -14EO sulfates, and combinations thereof.

22. The composition of claim 21, wherein the anionic alkoxy sulfate surfactant is selected from the group consisting of $C_{32}$-7PO -6EO sulfates, C32 -7PO -14EO sulfates, and combinations thereof.

23. A method of producing a hydrolytically stable anionic surfactant composition comprising:
   (a) adding an anionic surfactant composition to a solvent, wherein the solvent is selected from the group consisting of water, polymer containing solutions, and combinations thereof;
   (b) adding a stabilizing agent comprising an alkalinity generating agent to the solvent, wherein the alkalinity generating agent is added in an effective amount to produce a composition having a pH of from about 10 to 11.41;
   (c) forming the hydrolytically stable anionic surfactant composition from the anionic surfactant composition, the stabilizing agent, and the solvent,
   wherein the anionic alkoxy sulfate surfactant comprises a $C_{12-32}$-7PO-nEO sulfate, wherein the "EO" represents one or more "ethylene oxide" segments, the "PO" represents one or more "propylene oxide" segments, and n is an integer of from 3 to 14.

24. The method of claim 23, wherein the alkalinity generating agent is selected from the group consisting of alkali earth metal hydroxides, ammonia, $Na_2CO_3$, Na-metaborate, $EDTANa_4$, and combinations thereof.

25. The method of claim 23, wherein the composition comprises the alkalinity generating agent in a range between 0.05 wt % and about 2 wt %.

26. The method of claim 23, wherein the composition is hydrolytically stable at a temperature of 100° C.

27. The method of claim 23, wherein the composition has a half-life of at least 8 months at 100° C.

28. The method of claim 23, wherein the composition has a half-life at 100° C. in the range between 1 month and 24 months.

29. The method of claim 23, wherein the composition would be less than 25% hydrolyzed after 4 months at 100° C.

30. The method of claim 23, wherein the composition would have a degree of hydrolysis in the range between 1% and 24% after 4 months at 100° C.

31. The method of claim 23, the composition is configured for use alone in an enhanced oil recovery (EOR) application.

32. The method of claim 23, wherein the composition is configured for use with an alkaline-surfactant-polymer formulation in an enhanced oil recovery (EOR) application.

33. The method of claim 23, wherein the anionic surfactant composition further comprises $C_{12-15}$-3EO sulfates.

34. The method of claim 33, wherein the anionic surfactant composition is added in an amount that is at least 1 wt %.

35. The method of claim 23, wherein the alkalinity generating agent comprises $Na_2CO_3$.

36. The method of claim 35, wherein the alkalinity generating agent is added in an amount that is at least 1 wt %.

37. The method of claim 23, wherein the anionic alkoxy sulfate surfactant is selected from the group consisting of $C_{16-18}$-7PO-5EO sulfates, $C_{20}$-7PO-10EO sulfates, $C_{32}$-7PO-6EO sulfates, $C_{32}$-7PO-14EO sulfates, and combinations thereof.

38. The method of claim 37, wherein the anionic alkoxy sulfate surfactant surfactant is selected from the group consisting of $C_{32}$-7PO -6EO sulfates, $C_{32}$-7PO-14EO sulfates, and combinations thereof.

\* \* \* \* \*